UNITED STATES PATENT OFFICE.

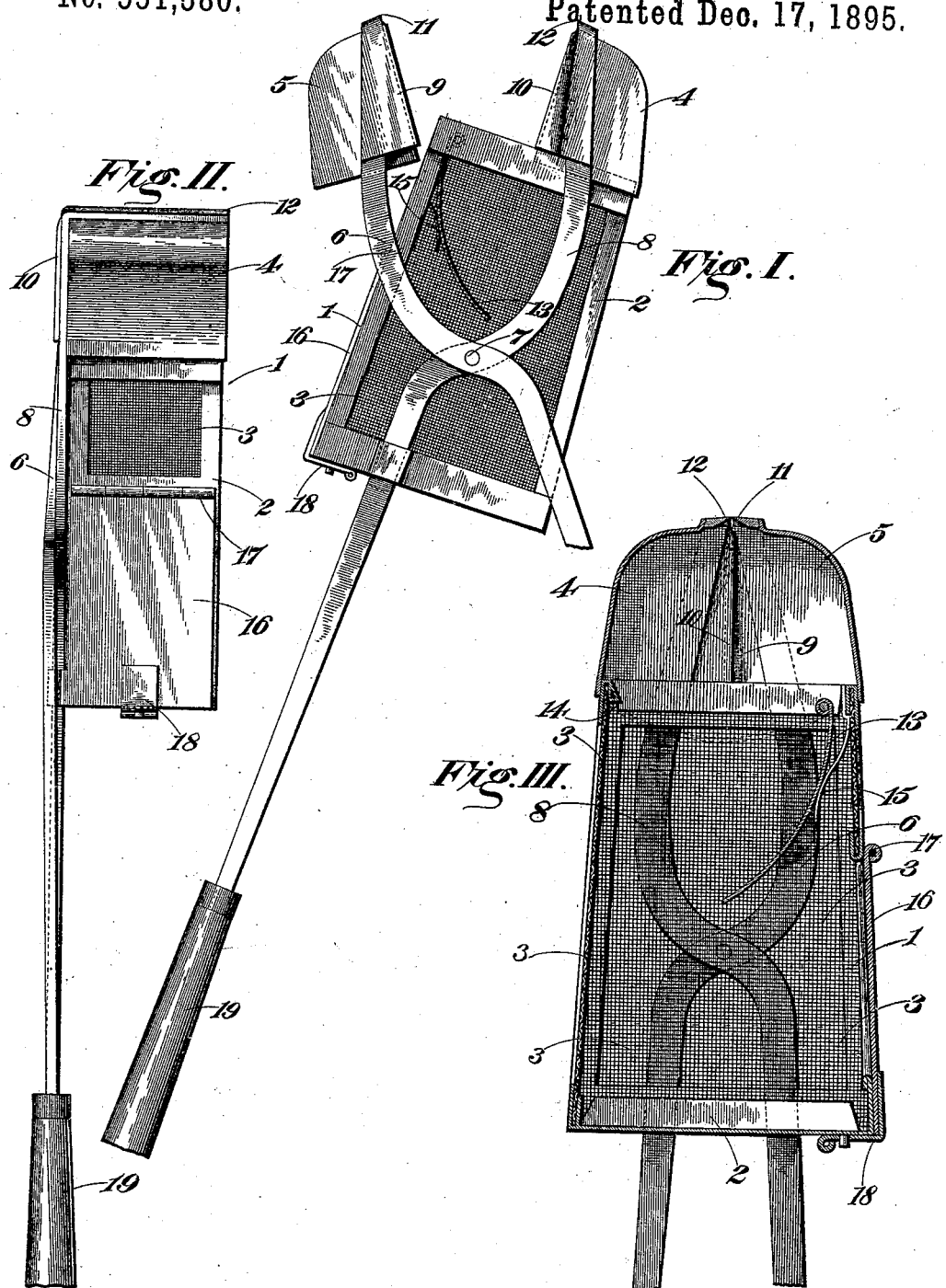

WILLIAM ATKINSON COULSON AND MICHAEL REUS, OF ESCATAWPA, MISSISSIPPI.

FRUIT-GATHERER.

SPECIFICATION forming part of Letters Patent No. 551,580, dated December 17, 1895.

Application filed March 14, 1895. Serial No. 541,767. (No model.)

*To all whom it may concern:*

Be it known that we, WILLIAM ATKINSON COULSON and MICHAEL REUS, of Escatawpa, county of Jackson, State of Mississippi, have invented certain new and useful Improvements in Fruit-Gatherers, of which the following is a specification, reference being had to the accompanying drawings.

The object of our invention is to produce an improved fruit-gatherer which will, with facility, sever the fruit from the bough on which it hangs and, having severed it, will, without bruising, convey it to a receptacle which, when filled, may be emptied from time to time as required.

In the accompanying drawings, Figure I is a side elevation of our gatherer completely open. Fig. II is a view of the same, taken at right angles to that shown in Fig. I. Fig. III is a central vertical longitudinal section of the gatherer with the jaws closed and looking toward the lateral jaws.

Referring to the figures on the drawings, 1 indicates a receptacle which may consist of a metallic frame 2, having wire cloth or netting sides 3 and provided with a hood 4 fixed to the upper end thereof.

5 indicates a movable hood that is supported upon and actuated by a lever 6 pivoted, as indicated at 7, to an arm 8 that is securely fastened to the frame of the receptacle. The arm and lever constitute shears having lateral blades 9 and 10, respectively, which preferably overlap in cutting like shear-blades. They are also provided with terminal transverse jaws 11 and 12, which may cut by abutting edges or by shearing edges, as preferred. The lateral blades and the transverse jaws constitute, in effect, a framework for the fixed and movable hoods, respectively. We prefer to employ shearing lateral blades because the adjustment can be more easily effected when they are used than if abutting lateral cutting-blades were employed.

13 indicates a trap-door which may be hinged to the opposite walls of the receptacle near its upper end. The trap-door is preferably made of metal and is preferably slightly curved. It extends entirely across the mouth of the receptacle and when closed is supported as by a ledge 14 on the opposite side of the receptacle from its hinged end. The office of the trap-door partially is to automatically close the receptacle and prevent the spilling of fruit if the receptacle should be turned upside down. The remaining office of the trap-door is to present a cushion or buffer for the fruit when it is severed from the tree to break the force of its fall into the receptacle. For that reason the curved shape above alluded to is preferred. In addition thereto we prefer also to employ a supporting-spring 15, located between the walls of the receptacle, which is designed to give it a sufficient yielding resiliency. It will be noticed, however, that the spring 15 is only brought into operative relation with the trap-door when the latter is in an open position. It is not designed to keep the door normally closed, but is merely intended to yieldingly support the door in the open or inclined position, so that when the plucked fruit strikes the door the force of its fall will be broken by its yielding impact and will not materially impede its progress.

16 indicates a discharge-door, 17 the hinge thereof and 18 the catch. The discharge-door is preferably located behind the trap in one side of the receptacle, the object being to avoid the liability of the descending fruit to force the side door open, the trap-door acting as a guard and deflector. The ends of the pivoted levers 6 and 8, respectively, are preferably provided with adjustable handles 19, which may be of any suitable length and thereby accommodate the implement to any height of tree, in practice.

What we claim is—

1. The combination with a receptacle, of a fixed hood on the upper end thereof, a pivoted lever provided with a movable hood, knife edges upon the hoods, respectively, a supporting arm, and a trap door pivoted in the upper end of the receptacle, and means for yieldingly sustaining the trap door when in the open position and not otherwise, substantially as specified.

2. The combination with a receptacle and fruit plucking mechanism above the same, of a curved trap door pivoted at one edge in the upper part of the receptacle, and a spring secured to the receptacle below the trap door to yieldingly sustain the same in an inclined position to break the force of the fall of the plucked fruit, substantially as specified.

3. The combination with a receptacle, of a fixed hood thereabove, a lever pivoted to the receptacle and provided with a movable hood, lateral shear blades and transverse blades upon the hoods, respectively, and a trap door pivoted in the upper part of the receptacle, a trap door supporting ledge designed to limit the movement of the trap door in one direction, and a spring limiting the movement of the trap door in the opposite direction, substantially as specified.

4. The combination with a receptacle, pivoted levers and fruit plucking jaws thereon above the receptacle, of a pivoted deflector within the receptacle below the jaws, and a discharge door in the wall of the receptacle behind the deflector, substantially as set forth.

In testimony of all which we have hereunto subscribed our names.

WILLIAM ATKINSON COULSON.
MICHAEL REUS.

Witnesses:
  TOM DANTZLER, Jr.,
  THOS. J. DICKSON.